(12) United States Patent
Bhambra et al.

(10) Patent No.: US 12,004,110 B2
(45) Date of Patent: Jun. 4, 2024

(54) AUTOMATED DETECTION OF A RADIO NODE LOCATION CHANGE

(71) Applicant: ARRIS Enterprises LLC, Suwanee, GA (US)

(72) Inventors: Amardeep Singh Bhambra, Bhayandar (IN); Kaushik Guha, Fremont, CA (US); Ravi Sharma, Santa Clara, CA (US); Awaiz Ahmad Khan, Milpitas, CA (US)

(73) Assignee: Rucks IP Holdings LLC, Claremont, NC (US)

( * ) Notice: Subject to any disclaimer, the term of this patent is extended or adjusted under 35 U.S.C. 154(b) by 316 days.

(21) Appl. No.: 17/211,971

(22) Filed: Mar. 25, 2021

(65) Prior Publication Data
US 2021/0306970 A1    Sep. 30, 2021

Related U.S. Application Data

(60) Provisional application No. 63/071,720, filed on Aug. 28, 2020, provisional application No. 63/001,449, filed on Mar. 29, 2020.

(51) Int. Cl.
*H04W 60/04*   (2009.01)
*G01S 19/45*   (2010.01)
*H04W 60/06*   (2009.01)
*H04W 64/00*   (2009.01)
*H04W 68/00*   (2009.01)
*H04W 76/30*   (2018.01)

(52) U.S. Cl.
CPC ............. *H04W 60/04* (2013.01); *G01S 19/45* (2013.01); *H04W 60/06* (2013.01); *H04W 64/006* (2013.01); *H04W 68/005* (2013.01); *H04W 76/30* (2018.02)

(58) Field of Classification Search
CPC ..... H04W 60/04; H04W 76/30; H04W 60/06; H04W 64/006; H04W 68/005; G01S 19/45
See application file for complete search history.

(56) References Cited

U.S. PATENT DOCUMENTS

| | | | |
|---|---|---|---|
| 11,284,339 B2 * | 3/2022 | Sasindran | H04W 76/10 |
| 2019/0007990 A1 * | 1/2019 | Kaliaperumal | H04W 72/51 |
| 2020/0008138 A1 * | 1/2020 | Sasindran | H04W 76/10 |
| 2021/0160698 A1 * | 5/2021 | Sevindik | H04W 28/16 |
| 2021/0306970 A1 * | 9/2021 | Bhambra | H04W 24/02 |

* cited by examiner

*Primary Examiner* — Ajay Cattungal
(74) *Attorney, Agent, or Firm* — Steven Stupp

(57) ABSTRACT

A radio node that selectively performs a remedial action is described. During operation, the radio node detects a potential change in a location of the radio node relative to a predefined location. For example, the radio node may detect the potential change in the location based at least in part on a change in a network parameter of the radio node and/or by performing a scan of wireless signals in an environment of the radio node. Then, in response to detecting the potential change in the location, the radio node determines the location of the radio node (e.g., by using a positioning system). When there is at least a predefined change in the location of the radio node relative to the predefined location, the radio node selectively performs the remedial action. Notably, the remedial action may include: providing an alert or a notification, discontinuing transmissions, or re-register the radio node.

20 Claims, 9 Drawing Sheets

AUTOMATED DETECTION OF A RADIO NODE LOCATION CHANGE

CROSS REFERENCE TO RELATED APPLICATIONS

This application claims priority under 35 U.S.C. 119(e) to: U.S. Provisional Application Ser. No. 63/071,720, "Automated Detection of a Radio Node Location Change," filed on Aug. 28, 2020, by Amardeep Singh Bhambra, et al.; and U.S. Provisional Application Ser. No. 63/001,449, "Automated Radio Node Registration in a Small Cell," filed on Mar. 29, 2020, by Awaiz Khan, et al., the contents of both of which are herein incorporated by reference.

FIELD

The described embodiments relate to techniques for communicating information among electronic devices. Notably, the described embodiments relate to techniques for automatically detecting when a location of a radio node in a small cell has changed.

BACKGROUND

While many electronic devices communicate with each other via large networks owned by a network operator, small-scale networks associated with entities are increasingly common. For example, a cellular-telephone network provided by a mobile network operator includes so-called 'macrocells' with base stations, while a small cell is a type of small-scale network provided by a different entity, such as a company or an organization. A small cell includes radio access nodes (which are sometimes referred to as 'radio nodes') that provide lower power than macroscells. Therefore, small cells provide smaller coverage areas than macrocells.

In principle, small cells complement the service offered by a cellular-telephone network and can offer improved communication performance, such as in a particular venue or environment. In practice, it can be difficult to manage resources in a small cell, which can impact the communication performance.

Notably, when a radio node is installed, government regulations may require that information about the radio node be determined and reported or registered. For example, in a Citizens Broadband Radio Service (CBRS), the information may need to be reported to a spectrum allocation server (SAS). However, it can be time-consuming and complicated for a certified professional installer to determine the information. This may make it more difficult to install radio nodes and, thus, may increase the cost of installing and using small cells.

Moreover, when a location of the radio node changes, the certified professional installer may need to re-register the radio node. This may include determining a new location of the radio node and reporting this information to the SAS. However, this process can be time-consuming and complicated. In addition, until the new location is determined and registered by the certified professional installer, the radio node may not be used in the CBRS. Thus, these requirements may make it more difficult and expensive to manage and use radio nodes and small cells.

SUMMARY

In a first group of embodiments, a computer that determines registration information for a radio node is described. This computer includes: a processor; and memory that stores program instructions. During operation, the computer may provide information that specifies a user interface with a graphical representation of a region that includes a first location. Then, the computer may receive information that specifies user-interface activity, where the user-interface activity indicates that the radio node is installed at the first location, and specifies two reference points in the region or on a boundary of the region. In response, the computer may calibrate two geometric scales of the region based at least in part on the two reference points. Next, the computer may determine geometric coordinates of the first location having a predefined accuracy in a horizontal plane. Moreover, the computer may provide the geometric coordinates of the first location.

For example, the computer may include an interface circuit, and the providing of the information specifying the user interface, the receiving of the information specifying the user-interface activity, and the providing of the geometric coordinates may involve communication, via the interface circuit, with an electronic device (which may display the user interface and/or the geometric coordinates on a display of the electronic device). Alternatively or additionally, the computer may include a display, and providing of the information specifying the user interface may involve displaying the user interface on the display, the receiving of the information specifying the user-interface activity may involve a user-interface device or the display, and the providing of the geometric coordinates may involve displaying the geometric coordinates on the display and/or providing the geometric coordinates to the electronic device.

Moreover, the graphical representation may include a map and the region may include at least a portion of a building. In some embodiments, the computer receives the map from a second electronic device, which may be the same as or different from the electronic device.

Furthermore, user-interface activity may specify virtual pins or markers in the graphical representation corresponding to the first location and the two reference points. Additionally, the two geometric scales may include a length and a width of the region.

In some embodiments, determining the geometric coordinates involves calculating the geometric coordinates based at least in part on the two geometric scales and geometric coordinates of at least one of the two reference points.

Moreover, the geometric coordinates may include a height of the first location, and the computer may compute the height having a second predefined accuracy in a vertical direction based at least in part on a predefined height per floor in a building and a number of floors corresponding to the region. Furthermore, the computer may receive the predefined height per floor. For example, the computer may receive information specifying second user interface activity, which corresponds to the predefined height per floor.

Alternatively or additionally to the aforementioned operations, the computer may receive information that specifies third user-interface activity, where the third user-interface activity indicates a prospective relocation of the radio node from the first location to a second location in the region. For example, the third user-interface activity may change a placement of the radio node in the graphical representation, and the change in the placement may correspond to the prospective relocation. In response, the computer may determine geometric coordinates of the second location having the predefined accuracy. Moreover, when the second location is more than an allowed distance from the first location, the computer may perform an action. Notably, the computer may: provide information about the prospective relocation to a server (such as a SAS) associated with a network that includes the radio node (such as the CBRS); provide an alert; request confirmation of the prospective relocation; and/or perform a remedial action (such as schedule a visit by an installer, e.g., a certified professional installer, to complete the prospective relocation, e.g., to re-register the radio node at the second location).

Note that the radio node may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than Long Term Evolution), etc.

Another embodiment provides the electronic device.

Another embodiment provides a computer-readable storage medium with program instructions for use with the computer or the electronic device. When executed by the computer or the electronic device, the program instructions cause the computer or the electronic device to perform at least some of the aforementioned operations in one or more of the preceding embodiments.

Another embodiment provides a method, which may be performed by the computer or the electronic device. This method includes at least some of the aforementioned operations in one or more of the preceding embodiments.

In a second group of embodiments, a radio node that selectively performs a remedial action is described. This radio node includes: a first interface circuit that communicates with one or more electronic devices in a network; a second interface circuit that communicates with one or more other radio nodes in the network; a processor; and memory that stores program instructions. During operation, the radio node detects a potential change in a location of the radio node relative to a predefined location. Then, in response to detecting the potential change in the location, the radio node determines the location of the radio node. When there is at least a predefined change in the location of the radio node relative to the predefined location, the radio node selectively performs the remedial action.

In some embodiments, the radio node may detect the potential change in the location based at least in part on a change in one or more network parameters of the radio node. For example, the change in the one or more network parameters may include one or more of: a change in a subnet that includes the radio node, a change in an Internet Protocol (IP) address of the radio node, expiration of a dynamic host control protocol (DHCP) IP address of the radio node, a change in a switch coupled to the radio node, or a change in a port in the switch coupled to the radio node. Moreover, the radio node may detect the potential change in the location based at least in part on a scan of wireless signals in an environment of the radio node.

Furthermore, the location is determined using a positioning system (such as a Global Positioning System) and/or based at least in part on a wireless neighborhood of the radio node.

Additionally, the predefined change in the location may be at least 3 m along a first direction or at least 50 m in a plane defined by a second direction and a third direction that are perpendicular to the first direction.

In some embodiments, the radio node calculates that there is at least the predefined change in the location of the radio node using two or more of: the change in the one or more network parameters, the scan, and the determined location.

Note that the network may include a small cell.

Moreover, the radio node may include: an eNodeB, a UMTS NodeB and RNC, a NR gNB or gNodeB, etc.

Furthermore, the radio node may communicate with the one or more electronic devices using a cellular-telephone communication protocol (such as Long Term Evolution or LTE), and the radio node may communicate with the one or more other radio nodes using a wired communication protocol.

Additionally, the remedial action may include: providing an alert or a notification; discontinuing transmissions from the radio node; re-register the radio node (such as scheduling a certified professional installer to re-register the radio node at the determined location); or provide information about the determined location to a server (such as a SAS) associated with the network that includes the radio node.

Another embodiment provides a computer-readable storage medium with program instructions for use with the radio node. When executed by the radio node, the program instructions cause the radio node to perform at least some of the aforementioned operations in one or more of the preceding embodiments.

Another embodiment provides a method, which may be performed by the radio node. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
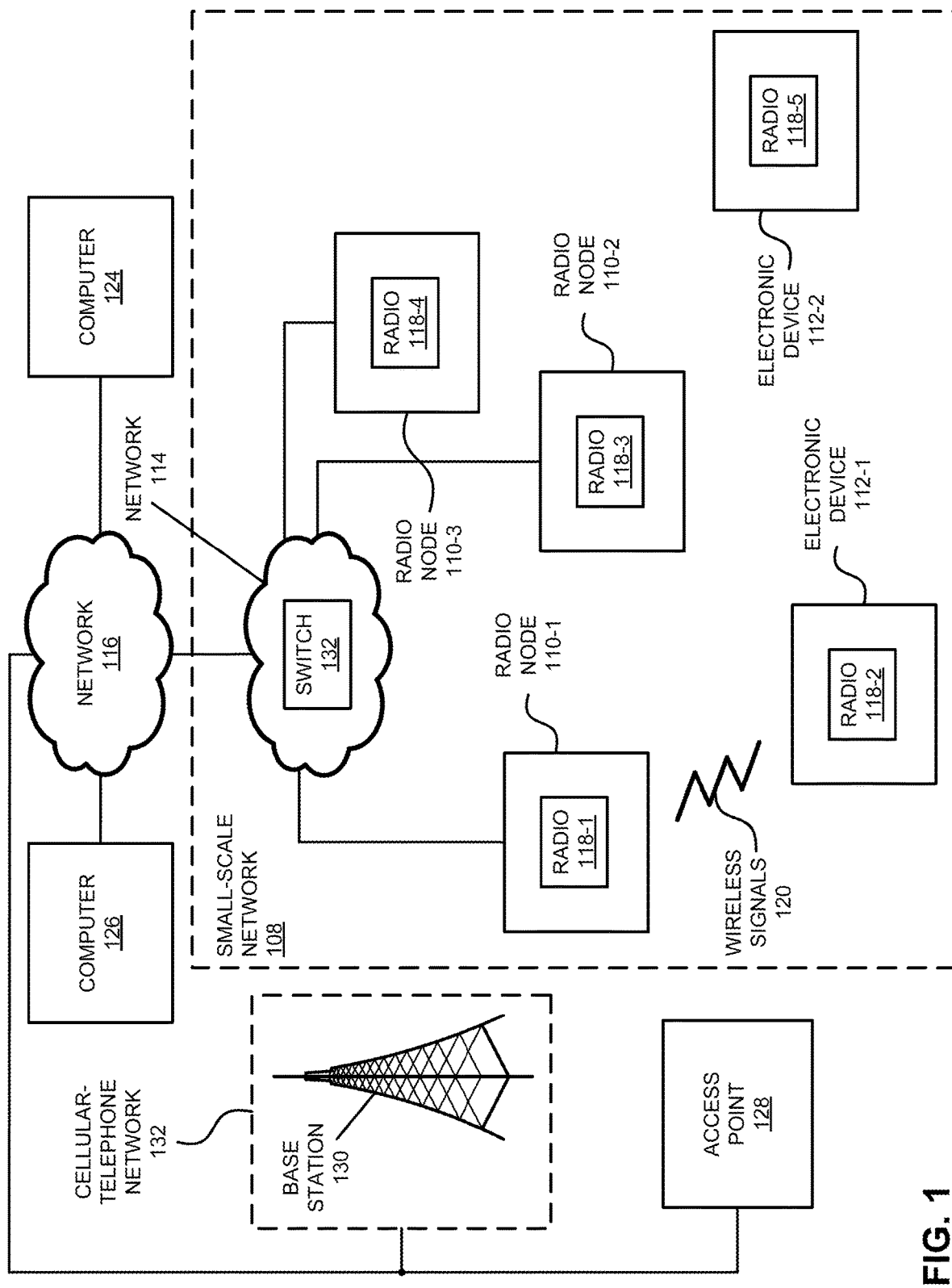
FIG. 1 is a block diagram illustrating an example of communication among computers, radio nodes and electronic devices in a system in accordance with an embodiment of the present disclosure.

In a first group of embodiments, a computer that performs an action is described. During operation, the computer may provide information that specifies a user interface with a graphical representation of a region that includes a first location of a radio node. Then, the computer may receive information that specifies user-interface activity, where the user-interface activity indicates a prospective relocation of the radio node from the first location to a second location in the region. For example, the user-interface activity may change a placement of the radio node in the graphical representation, and the change in the placement may correspond to the prospective relocation. In response, the computer may determine geometric coordinates of the second location having a predefined accuracy in a horizontal plane. Moreover, when the second location is more than an allowed distance from the first location, the computer may perform the action. Notably, the computer may: provide information about the prospective relocation to a server (such as a SAS) associated with a network that includes the radio node (such as the CBRS); provide an alert; request confirmation of the prospective relocation; and/or perform a remedial action (such as schedule a visit by an installer, e.g., a certified professional installer, to complete the prospective relocation).

In a second group of embodiments, a radio node that selectively performs a remedial action is described. During operation, the radio node detects a potential change in a location of the radio node relative to a predefined location. For example, the radio node may detect the potential change in the location based at least in part on a change in one or more network parameters of the radio node and/or by performing a scan of wireless signals in an environment of the radio node. Then, in response to detecting the potential change in the location, the radio node determines the location of the radio node (e.g., by using a Global Positioning System and/or based at least in part on a wireless neighborhood of the radio node). When there is at least a predefined change in the location of the radio node relative to the predefined location, the radio node selectively performs the remedial action. Notably, the remedial action may include: providing an alert or a notification, discontinuing transmissions, or re-register the radio node.

By performing the action, these management techniques may facilitate management of the radio node and/or a network that includes the radio node. For example, the management techniques may help ensure compliance with regulations. Notably, the location (or geometric coordinates) of the radio node may need to be registered with the server, and changes exceeded the allowed distance or the predefined amount may require confirmation and re-registration by the certified professional installer. Thus, the management techniques may facilitate management of the radio node and the network, as well as regulatory compliance. These capabilities may simplify operation of the radio node and the network, which may reduce associated cost and complexity.

We now describe some embodiments of the management techniques. As discussed previously, a cellular-telephone network may include base stations (and associated cell towers) that implement macrocells. These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the disclosed embodiments of the management techniques.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users, which is a non-limiting numerical example) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density, indoor or crowded environments. While the use of femto cells and/or small cells can mitigate this challenge, these small-scale networks pose other challenges.

Notably, there are often regulatory requirements associated with radio nodes in small cells. For example, in the CBRS, the radio nodes need to be registered with a SAS. The registration information includes the geometric coordinates of a given radio node (and, more generally, coordinates of the given radio node in a coordinate system, such as a geographic coordinate system). In particular, the geometric coordinates in a horizontal plane need to be specified to within 50 m (or a predefined horizontal accuracy), and the height in a vertical direction needs to be specified to within 3 m (or a predefined vertical accuracy). Moreover, in order to ensure that the registration information is accurate, the given radio node typically needs to be installed by a certified professional installer. During installation, the certified professional installer usually needs to determine the geometric coordinates and then provide the registration information to the SAS. Furthermore, if the given radio node is moved by more than the predefined horizontal accuracy or the predefined vertical accuracy, a certified professional install typically has to repeat the determining of the geometric coordinates and the providing of the registration information to the SAS. Complying with these requirements is often time-consuming and expensive, and adds to the complexity of installing and maintaining radio nodes in a small cell. These challenges are addressed in the management techniques described below.

In the discussion that follows, LTE (from the 3rd Generation Partnership Project of Sophia Antipolis, Valbonne, France) is used as an illustration of a data communication protocol in a cellular-telephone network that is used during communication between one or more radio nodes and an electronic device. Consequently, eNodeBs or eNBs are used as illustrative examples of the radio nodes. However, a wide variety of communication techniques or protocols may be readily used for the various embodiments. For example, an electronic device and a radio node may communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Texas), Bluetooth (from the Bluetooth Special Interest Group of Kirkland, Washington), a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as another communication protocol). Thus, the radio nodes may include: an eNodeB, a UMTS NodeB and RNC, an NR gNB or gNodeB, etc. In some embodiments, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies.

Moreover, a radio node may communicate with other radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among electronic devices according to some embodiments. Notably, radio nodes 110 in a small-scale network 108 (such as a small cell) can communicate LTE data frames or packets using LTE with an electronic devices 112 (which is sometimes referred to as 'user equipment' or UE, such as a cellular telephone and, more generally, a fixed or portable electronic device). Again, while LTE is used as an example of a cellular protocol, the embodiments herein are not so limited. Moreover, radio nodes 110 may also communicate with each other via wireless or wired communication (such as Ethernet) in network 114 and/or computer 124 (such as a controller) or computer 126 (such as a SAS) via wireless or wired communication (such as Ethernet) in network 116. Note that networks 114 and 116 may be the same or different networks. For example, networks 114 and/or 116 may an intra-net or the Internet.

As described further below with reference to FIGS. 2-8, one or more of electronic devices 112 and/or computer 124 may perform embodiments of the management techniques by communicating via network 114. Notably, the management techniques may be performed at least in part by computer 124 and, e.g., electronic device 112-1 in a client-server architecture. Alternatively or additionally, the management techniques may be performed at least in part by, e.g., electronic device 112-1 using a stand-alone application installed on and that executes on electronic device 112-1.

In the embodiments of the client-server architecture, computer 124 may provide to electronic device 112-1 information that specifies a user interface with a graphical representation of a region that includes a current location (or position) of radio node 110-1. Note that the graphical representation may include a map of the region (such as a Joint Photographic Experts Group or JPEG image of a map) and the region may include at least a portion of a building. For example, the map may include a floor plan of a floor in a building. In some embodiments, computer 124 receives the map from another computer (not shown) via network 116.

After receiving the information that specifies the user interface, electronic device 112-1 may display the user interface, e.g., on a touch-sensitive display. A user of electronic device 112-1 may interact with the touch-sensitive display, another user-interface device (such as a keyboard, a mouse, a stylus, a trackpad, a natural user interface in which user actions, such as gestures, do not involve direct contact with, e.g., the touch-sensitive display, etc.), and/or a natural-language user interface (in which received acoustic signals are analyzed using natural language processing to determine a user command or action). The user interaction, which is henceforth referred to as user-interface activity may indicate a prospective relocation (or possible relocation) of radio node 110-1 from the current location to a new location in the region. For example, the user-interface activity may change a placement radio node 110-1 in the graphical representation, and the change in the placement may correspond to the prospective relocation. As described further below with reference to FIG. 5, in some embodiments the user-interface activity specifies a virtual pin or marker in the graphical representation corresponding to the new location of radio node 110-1. Notably, the user may drag and drop the virtual pin or marker from the current location to the new location.

Then, electronic device 112-1 may provide, to computer 124, information that specifies the prospective relocation. For example, the information may include or may correspond to the user-interface activity. In response, computer 124 may determine geometric coordinates of the new location having a predefined horizontal accuracy (such as less than 50 m). Notably, the determining of the geometric coordinates may be based at least in part on two geometric scales of the region, such as the geometric scales corresponding to a length and a width of the region.

In some embodiments, a user of electronic device 112-1 may interact with the touch-sensitive display, the other user-interface device, and/or the natural-language user interface to specify two reference points in the region or on a boundary of the region. For example, the user may place virtual pins or markers in the graphical representation corresponding to or at the positions of the two reference points. After receiving user-interface activity that specifies the two reference points, electronic device 112-1 may provide information that specifies the two reference points to computer 124. In response, computer 124 may calibrate the two geometric scales of the region based at least in part on the two reference points. Subsequently, computer 124 may determine or calculate the geometric coordinates based at least in part on the two geometric scales and geometric coordinates of at least one of the two reference points. Note that determining the geometric coordinates may involve or use: a Global Positioning System, a local positioning system, a wireless local area network, a cellular-telephone network, triangulation and/or trilateration.

Moreover, in some embodiments, the geometric coordinates may include a height of the new location. Computer 124 may determine or compute the height having a predefined vertical accuracy (such as less than 3 m) in the vertical direction based at least in part on a predefined height per floor in a building and a number of floors corresponding to the region. In some embodiments, the user of electronic device 112-1 may interact with the touch-sensitive display, the other user-interface device, and/or the natural-language user interface to specify or select the predefined height per floor in the building (e.g., the user may make a selection in the user interface). After receiving user-interface activity that specifies the predefined height per floor in the building, electronic device 112-1 may provide information specifying the predefined height per floor in the building to computer 124, which may use this information when determining or computing the height. Thus, the determined geometric coordinates may be in two or three dimensions (2D or 3D). Furthermore, when the new location is more than an allowed distance from the current location (such as more than 50 m from the current location in the horizontal plane and/or more than 3 m from the current location in the vertical direction), computer 124 may perform an action. Notably, computer 124 may: provide information about the prospective relocation to computer 126 (such as a SAS in embodiments where small-scale network 108 uses a band of frequencies in the CBRS) associated with small-scale network 108; provide an alert to electronic device 112-1; provide a request for confirmation of the prospective relocation to electronic device 112-1; and/or perform a remedial action (such as schedule a visit by an installer, e.g., a certified professional installer, to complete the prospective relocation).

In embodiments where the action includes providing the alert and/or the request, electronic device 112-1 may provide the alert or the request. For example, electronic device 112-1 may display the alert on the touch-sensitive display (such as a warning that the prospective relocation involves a distance more than 50 m in the horizontal plane and/or more than 3 m in the vertical direction, and may require the services of an installer and/or re-registration of radio node 110-1 with computer 126) and/or may output sound on a speaker. Alternatively or additionally, electronic device 112-1 may display the determined geometric coordinates. In some embodiments, electronic device 112-1 may display the request on the touch-sensitive display. Then, electronic device 112-1 may receive additional user-interface activity corresponding to a response of the user, such as confirmation of the prospective relocation. This response may be provided by electronic device 112-1 to computer 124. Based at least in part on the response, computer 124 may perform an additional action, such as provide information about the prospective relocation to computer 126 (such as re-registering radio node 110-1 at the new location) and/or scheduling a visit by an installer (e.g., a certified professional installer).

Alternatively or additionally, in embodiments with a stand-alone application, electronic device 112-1 may display, e.g., on a touch-sensitive display, a user interface with a graphical representation of a region that includes a current location of radio node 110-1. A user of electronic device 112-1 may interact with the touch-sensitive display, the other user-interface device, and/or the natural-language user interface. This user-interface activity may indicate a prospective relocation of radio node 110-1 from a current location (or position) to a new location in the region. For example, the user-interface activity may change a placement radio node 110-1 in the graphical representation, and the change in the placement may correspond to the prospective relocation. As described further below with reference to FIG. 5, in some embodiments the user-interface activity specifies a virtual pin or marker in the graphical representation corresponding to the new location of radio node 110-1. Notably, the user may drag and drop the virtual pin or marker from the current location to the new location.

In response to the user-interface activity, electronic device 112-1 may determine geometric coordinates of the new location having a predefined horizontal accuracy (such as less than 50 m). Notably, the determining of the geometric coordinates may be based at least in part on two geometric scales of the region, such as the geometric scales corresponding to a length and a width of the region.

In some embodiments, a user of electronic device 112-1 may interact with the touch-sensitive display, the other user-interface device, and/or the natural-language user interface to specify two reference points in the region or on a boundary of the region. For example, the user may place virtual pins or markers in the graphical representation corresponding to or at the positions of the two reference points. After receiving user-interface activity that specifies the two reference points, electronic device 112-1 may calibrate the two geometric scales of the region based at least in part on the two reference points. Subsequently, electronic device 112-1 may determine or calculate the geometric coordinates based at least in part on the two geometric scales and geometric coordinates of at least one of the two reference points. Note that determining the geometric coordinates may involve or use: a Global Positioning System, a local positioning system, a wireless local area network, a cellular-telephone network, triangulation and/or trilateration.

Moreover, in some embodiments, the geometric coordinates may include a height of the new location. Electronic device 112-1 may determine or compute the height having a predefined vertical accuracy (such as less than 3 m) in the vertical direction based at least in part on a predefined height per floor in a building and a number of floors corresponding to the region. In some embodiments, the user of electronic device 112-1 may interact with the touch-sensitive display, the other user-interface device, and/or the natural-language user interface to specify or select the predefined height per floor in the building (e.g., the user may make a selection in the user interface). After receiving user-interface activity that specifies the predefined height per floor in the building, electronic device 112-1 may use the predefined height per floor in the building when determining or computing the height. Thus, the determined geometric coordinates may be in 2D or 3D.

Furthermore, when the new location is more than an allowed distance from the current location (such as more than 50 m from the current location in the horizontal plane and/or more than 3 m from the current location in the vertical direction), electronic device 112-1 may perform an action. Notably, electronic device 112-1 may: provide information about the prospective relocation to computer 126 (such as a SAS in embodiments where small-scale network 108 uses a band of frequencies in the CBRS) associated with small-scale network 108; provide an alert; provide a request for confirmation of the prospective relocation; and/or perform a remedial action (such as schedule a visit by an installer, e.g., a certified professional installer, to complete the prospective relocation).

In embodiments where the action includes providing the alert and/or the request, electronic device 112-1 may provide the alert or the request. For example, electronic device 112-1 may display the alert on the touch-sensitive display (such as a warning that the prospective relocation involves a distance more than 50 m in the horizontal plane and/or more than 3 m in the vertical direction, and may require the services of an installer and/or re-registration of radio node 110-1 with computer 126) and/or may output sound on a speaker. Alternatively or additionally, electronic device 112-1 may display the determined geometric coordinates. In some embodiments, electronic device 112-1 may display the request on the touch-sensitive display. Then, electronic device 112-1 may receive additional user-interface activity corresponding to a response of the user, such as confirmation of the prospective relocation. Based at least in part on the response, electronic device 112-1 may perform an additional action, such as provide information about the prospective relocation to computer 126 (such as re-registering radio node 110-1 at the new location) and/or scheduling a visit by an installer (e.g., a certified professional installer).

Alternatively or additionally, in embodiments the management techniques may be used to monitor and determine when a location of one of radio nodes 110 (such as radio node 110-1) has changed by more than a predefined amount (such as 50 m in a horizontal plane or 3 m in a vertical direction). When such a location change is determined, a remedial action may be performed. Note that these embodiments of the management techniques may, at least in part, be performed by a radio node (such as radio node 110-1), a group of two or more radio nodes 110 via network 114 (e.g., collaboratively by exchanging information among the group of two or more radio nodes 110), or by computer 124 via network 114 (e.g., radio node 110-1 may provide information to computer 124, which may determine when the location change occurs and which may then selectively perform the remedial action). In the discussion that follows, these embodiments of the management techniques are illustrated as being performed by radio node 110-1.

Notably, after installation and registration with computer 126, radio node 110-1 may have a predefined location. Then, during operation, radio node 110-1 may detect a potential change in a location of radio node 110-1 relative to the predefined location. For example, radio node 110-1 may detect the potential change in the location based at least in part on a change in one or more network parameters of radio node 110-1 (which may indicate that radio node 110-1 has been moved). In some embodiments, the change in the one or more network parameters may include one or more of: a change in a subnet that includes radio node 110-1, a change in an IP address of radio node 110-1, expiration of a DHCP IP address of radio node 110-1, a change in a switch (such as switch 132) coupled to radio node 110-1 via network 114, or a change in a port in switch 132 coupled to radio node 110-1 (e.g., using a link-level discovery protocol that provides information about a port identifier and/or a chassis identifier). Alternatively or additionally, radio node 110-1 may detect the potential change in the location based at least in part on a scan of wireless signals in an environment of radio node 110-1 (such as the wireless signals associated with one or more other radio nodes 110 or one or more electronic devices 112 that are in a neighbors of or proximity to radio node 110-1). Note that radio node 110-1 may detect the potential change by comparing the one or more network parameters and/or the result of the scan with stored information, such as: a stored IP address of radio node 110-1, a stored subnet of radio node 110-1, stored information specifying a switch, stored information specifying a port in a switch, a neighbor list (with identifiers of neighboring radio nodes 110-1 and/or associated signal strengths, e.g., a reference signal receive power or RSRP, or a signal-to-interference-plus-noise ratio or SINR).

In response to detecting the potential change in the location, radio node 110-1 may determine a location of radio node 110-1. For example, the location of radio node 110-1 may be determined using: a Global Positioning System, a local positioning system, a wireless local area network, a cellular-telephone network, triangulation and/or trilateration. Alternatively or additionally, the location of the radio node may be determined based at least in part on a wireless neighborhood of radio node 110-1 (such as identifiers of one or more radio nodes 110 in a neighbor list of radio node 110-1).

When there is at least a predefined change in the location of radio node 110-1 relative to the predefined location, radio node 110-1 may selectively perform the remedial action. For example, the remedial action may include: providing an alert or a notification; discontinuing transmissions from radio node 110-1; re-register radio node 110-1 (such as scheduling a certified professional installer to re-register radio node 110-1 at the determined location); or provide information about the determined location to computer 126. Note that the predefined change in the location may be at least 3 m along a vertical direction or at least 50 m in a horizontal plane that is perpendicular to the vertical direction. In some embodiments, radio node 110-1 calculates that there is at least the predefined change in the location of radio node 110-1 using two or more of: the change in the one or more network parameters, the scan, and/or the determined location. The use of multiple techniques may be needed when an accuracy associated with a Global Positioning System is insufficient, such as when radio node 110-1 is located indoors.

In some embodiments, the wireless communication in small-scale network 108 may use a shared-license-access band of frequencies. For example, the shared-license-access band of frequencies may include the CBRS near 3.5 GHz (such as the 150 MHz of bandwidth between 3.55 GHz and 3.7 GHz). Notably, a given radio node (such as radio node 110-1) may provide a grant request to computer 126 to reserve a portion of a spectrum or bandwidth (such as a portion of the spectrum in a shared-license-access band of frequencies or another band of frequencies) for its use. In some embodiments, radio node 110-1 may request a grant to reserve 5, 10, 20, 40, 80, 100 or 150 MHz of spectrum in CBRS from computer 126. In response, computer 126 may provide a grant response to radio node 110-1 with approval of a grant for the requested portion of the shared-license-access band of frequencies.

Then, radio node 110-1 may request from computer 126 authorization to transmit in the granted portion of the shared-license-access band of frequencies. For example, radio node 110-1 may provide a keep-alive message (such as a heartbeat request) to computer 126 in order to request authorization to transmit in the granted portion of the shared-license-access band of frequencies. When radio node 110-1 receives a keep-alive response from computer 126, then radio node 110-1 may be authorized to transmit in the granted portion of the shared-license-access band of frequencies until a transmit expire time has elapsed.

In these ways, the management techniques may facilitate management of radio node 110 and/or small-scale network 108 that includes radio nodes 110. Notably, the management techniques may warn a system operator when the prospective relocation of a radio node will require that the radio node be re-registered with computer 126 and, thus, will require that a certified professional installer be sent to the new location of the radio node. Alternatively, the management techniques may determine that the location of a given radio node has changed by more than a predefined amount, and may selectively perform a remedial action. This capability may simplify installation and operation of radio nodes 110 and small-scale network 108, which may reduce associated cost and complexity.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, radio nodes 110 and electronic devices 112 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 9:
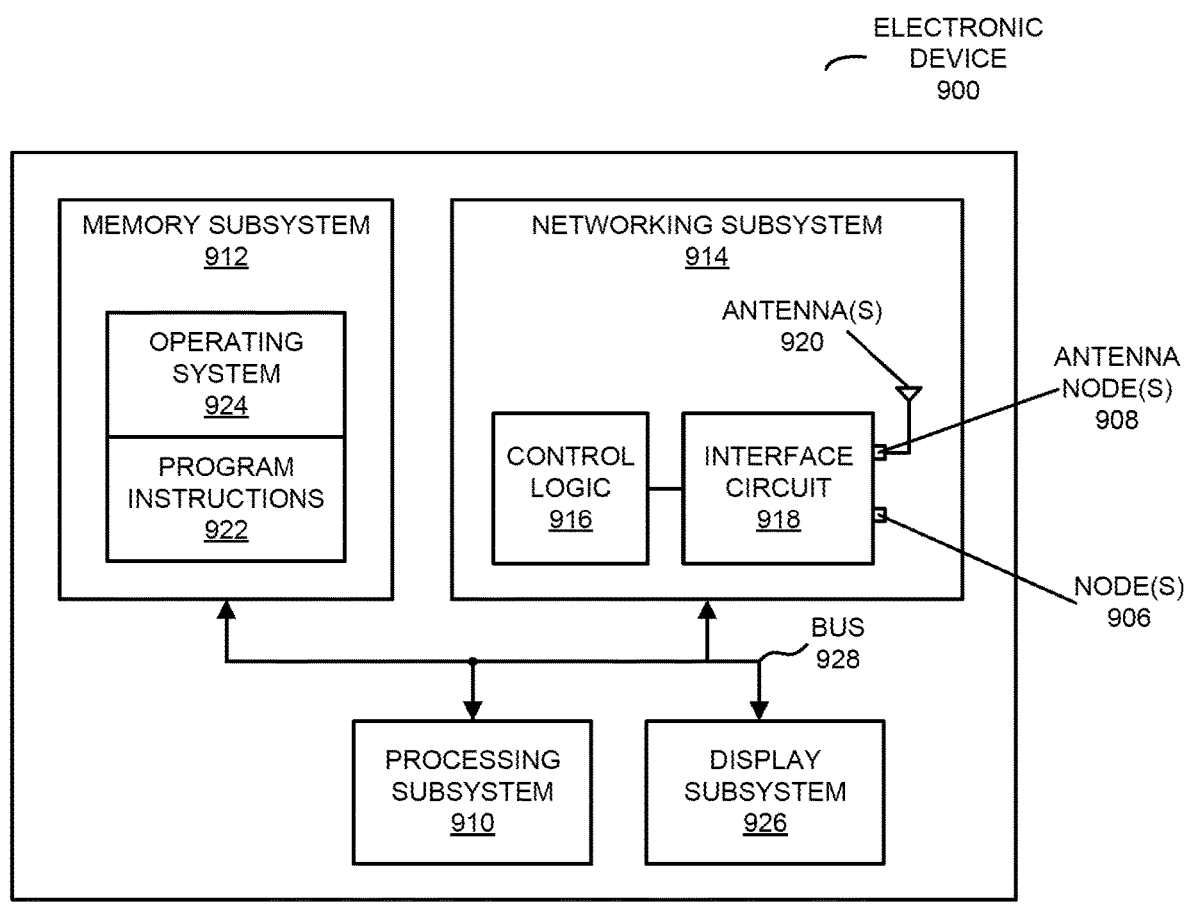
FIG. 9 is a block diagram illustrating an example of an electronic device in accordance with an embodiment of the present disclosure.

As described further below with reference to FIG. 9, radio nodes 110 and electronic devices 112 may include subsystems, such as a networking subsystem, a memory subsystem and a processor subsystem. In addition, radio nodes 110 and electronic devices 112 may include radios 118 in the networking subsystems. More generally, radio nodes 110 and electronic devices 112 can include (or can be included within) any electronic devices with the networking subsystems that enable radio nodes 110 and electronic devices 112 to wirelessly communicate with each other. This wireless communication can include transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

Moreover, as can be seen in FIG. 1, wireless signals 120 (represented by a jagged line) are transmitted by radios 118 in radio nodes 110 and electronic devices 112. For example, radio 118-1 in radio node 110-2 may transmit information (such as frames or packets) using wireless signals 120. These wireless signals are received by radios 118 in one or more other electronic devices (such as radio 118-2 in electronic device 112-1). This may allow radio node 110-2 to communicate information to other radio nodes 110 and/or electronic device 112-1. Note that wireless signals 120 may convey LTE frames or packets.

In the described embodiments, processing a frame that includes packets in radio nodes 110 and electronic devices 112 may include: receiving the wireless signals with the frame; decoding/extracting the frame from the received wireless signals to acquire the frame; and processing the frame to determine information contained in the payload of the frame (such as the packet).

While the preceding embodiments illustrate communication between computer 124 and electronic device 112-1 via radio node 110-2 in small-scale network 108, in other embodiments communication may occur via an access point 128 and/or a base station 130 in a cellular-telephone network 132.

Although we describe the network environment shown in FIG. 1 as an example, in alternative embodiments, different numbers or types of electronic devices may be present. For example, some embodiments include more or fewer electronic devices. As another example, in another embodiment, different electronic devices are transmitting and/or receiving frames that include packets.

Figure 2:
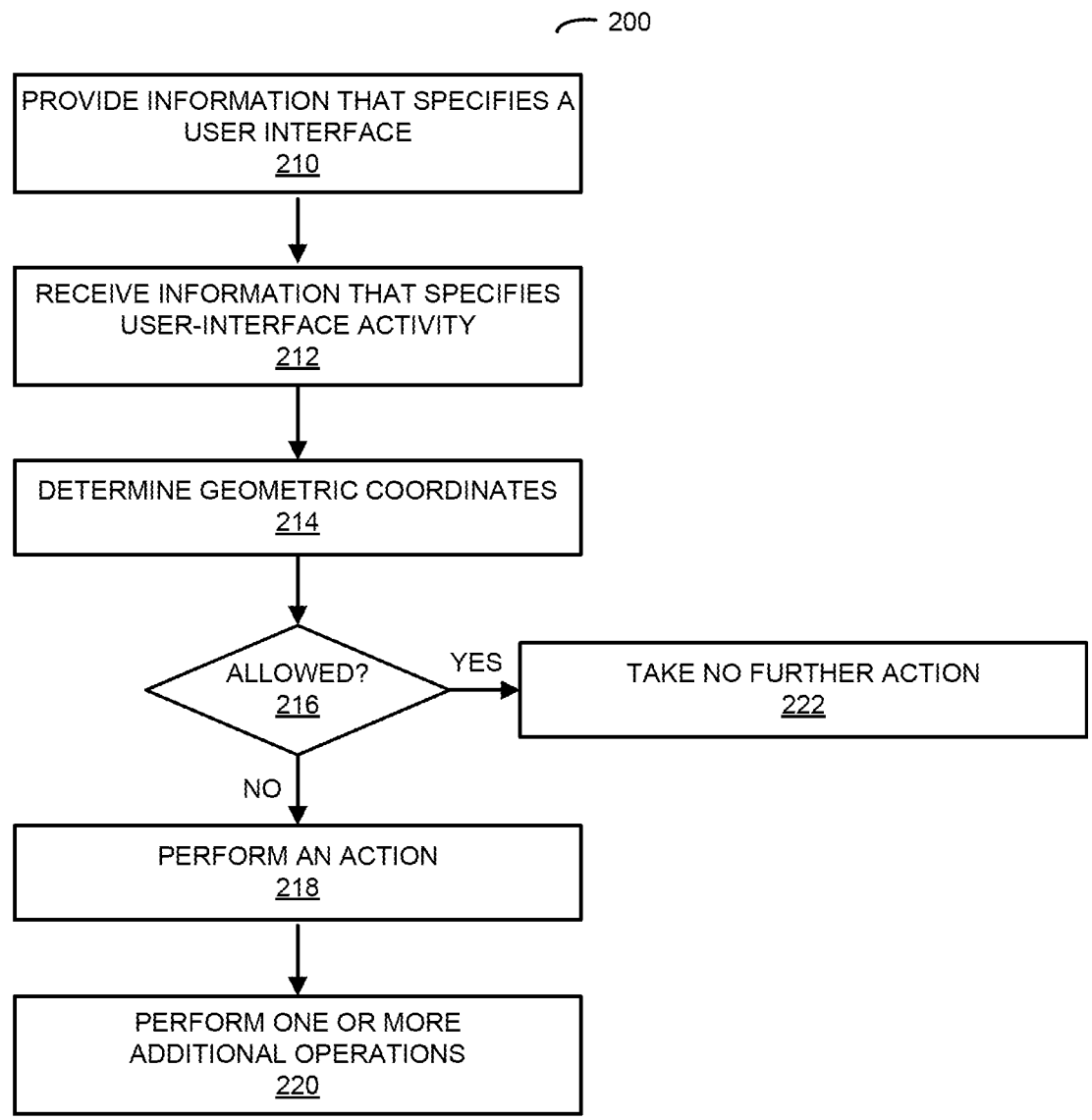
FIG. 2 is a flow diagram illustrating an example of a method for determining registration information for a radio node in FIG. 1 in accordance with an embodiment of the present disclosure.

We now describe embodiments of the methods. FIG. 2 presents a flow diagram illustrating an example of a method 200 for performing an action, which may be performed by a computer (such as computer 124 in FIG. 1). During operation, the computer may provide information that specifies a user interface (operation 210) with a graphical representation of a region that comprises a first location of a radio node. Note that the graphical representation may include a map of the region and the region may include at least a portion of a building. For example, the map may include a floor plan of a floor in a building.

Then, the computer may receive information that specifies user-interface activity (operation 212), where the user-interface activity indicates a prospective relocation of the radio node from the first location to a second location in the region. Based at least in part on the prospective relocation, the computer may determine geometric coordinates (operation 214) of the second location having the predefined accuracy in a horizontal plane. For example, the determining of the geometric coordinates may be based at least in part on two geometric scales of the region (such as the geometric scales corresponding to a length and a width of the region) and/or at least a reference point in the region or on a boundary of the region.

In some embodiments, the geometric coordinates may include a height of the first location, and determining the geometric coordinates may involve computing the height having a second predefined accuracy, e.g., in a vertical direction, based at least in part on a predefined height per floor in a building and a number of floors corresponding to the region.

Moreover, when the second location is more than an allowed distance from the first location (operation 216), the computer may perform the action (operation 218). For example, the action may include: providing information about the prospective relocation to a server or another computer (such as a SAS) associated with a network that includes the radio node (such as the CBRS); providing an alert; requesting confirmation of the prospective relocation; and/or performing a remedial action (such as schedule a visit by an installer, e.g., a certified professional installer, to complete the prospective relocation, e.g., to re-register the radio node at the second location). Note that the allowed distance may be less than 50 m from the first location in the horizontal plane and/or less than 3 m from the first location in the vertical direction.

In some embodiments, the computer optionally performs one or more additional operations (operation 220). For example, the computer may receive the map from another computer. Moreover, the computer may receive information that specifies second user-interface activity, where the user-interface activity specifies two reference points in the region or on the boundary of the region. In response, the computer may calibrate the two geometric scales of the region based at least in part on the two reference points.

Furthermore, the computer may receive the predefined height per floor. For example, the computer may receive information specifying second user interface activity, which corresponds to the predefined height per floor.

Note that the radio node may include: an eNodeB, a UMTS NodeB and RNC, an NR gNB or gNodeB.

In some embodiments of method 200, there may be additional or fewer operations. For example, when the second location is less than the allowed distance from the first location (operation 216), the computer may take no further action (operation 222). Furthermore, the order of the operations may be changed, and/or two or more operations may be combined into a single operation.

Figure 3:
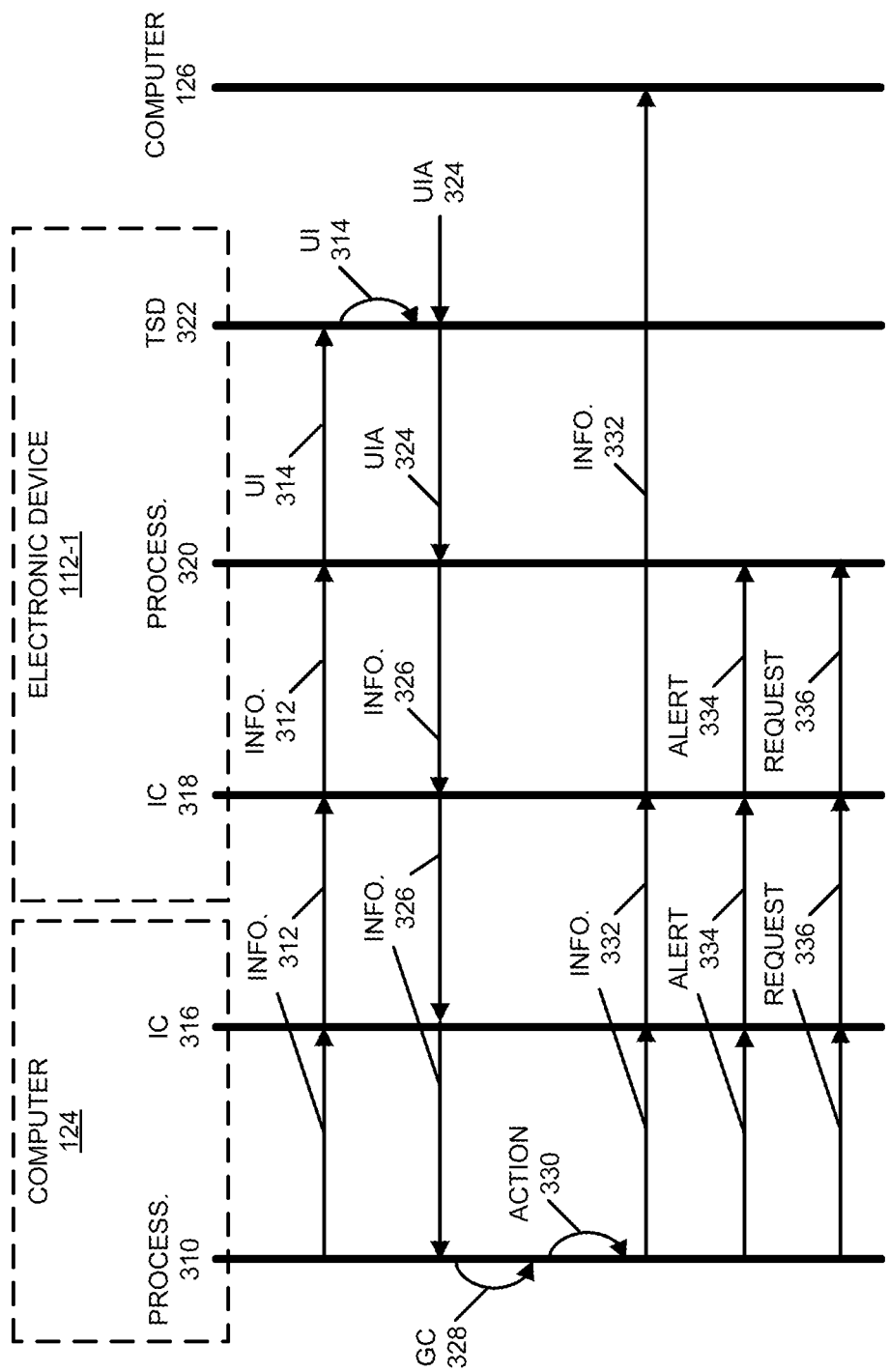
FIG. 3 is a drawing illustrating an example of communication among the electronic devices in FIG. 1 in accordance with an embodiment of the present disclosure.

Embodiments of the management techniques are further illustrated in FIG. 3, which presents a drawing illustrating an example of communication between electronic device 112-1, computer 124 and/or computer 126. In FIG. 3, processor 310 in computer 124 may provide an instruction to interface circuit 316 in computer 124 to provide to electronic device 112-1 information 312 that specifies a user interface (UI) 314 with a graphical representation of a region that includes a current location of radio node 110-1.

After receiving information 312, interface circuit 318 in electronic device 112-1 may provide information 312 to processor 320 in electronic device 112-1. Then, processor 320 may display user interface 314 on a touch-sensitive display (TSD) 322 in electronic device 112-1. A user may provide user-interface activity (UTA) 324 by interacting with user interface 314, e.g., via touch-sensitive display 322. This user-interface activity may indicate a prospective relocation of radio node 110-1 from the current location to a new location in the region. Touch-sensitive display 322 may provide user-interface activity 324 to processor 320, which provides information 326 that specifies the prospective relocation to interface circuit 318. Next, interface circuit 318 provide information 326 to computer 124.

Moreover, after receiving information 326, interface circuit 316 may provide information 326 to processor 310. In response, processor 310 may determine geometric coordinates (GC) 328 of the new location having a predefined horizontal accuracy (such as less than 50 m).

Furthermore, processor 310 may compare geometric coordinates 328 of the new location and the current location. When the new location is more than an allowed distance from the current location (such as more than 50 m from the current location in the horizontal plane and/or more than 3 m from the current location in the vertical direction), processor 310 may perform an action 330. Notably, processor 124 may: provide, via interface circuit 316, information 332 about the prospective relocation to computer 126; provide, via interface circuit 316, an alert 334 to electronic device 112-1; provide, via interface circuit 316, a request 336 for confirmation of the prospective relocation to electronic device 112-1; and/or perform a remedial action (such as schedule a visit by an installer, e.g., a certified professional installer, to complete the prospective relocation).

While FIG. 3 illustrates communication between components using unidirectional or bidirectional communication with lines having single arrows or double arrows, in general the communication in a given operation in this figure may involve unidirectional or bidirectional communication.

As discussed previously, the management techniques may be implemented, at least in part, using one or more user interfaces. Notably, a user interface may be used to assist in determining registration information associated with radio node 110-1 (FIG. 1), such as during an installation process.

Figure 4:
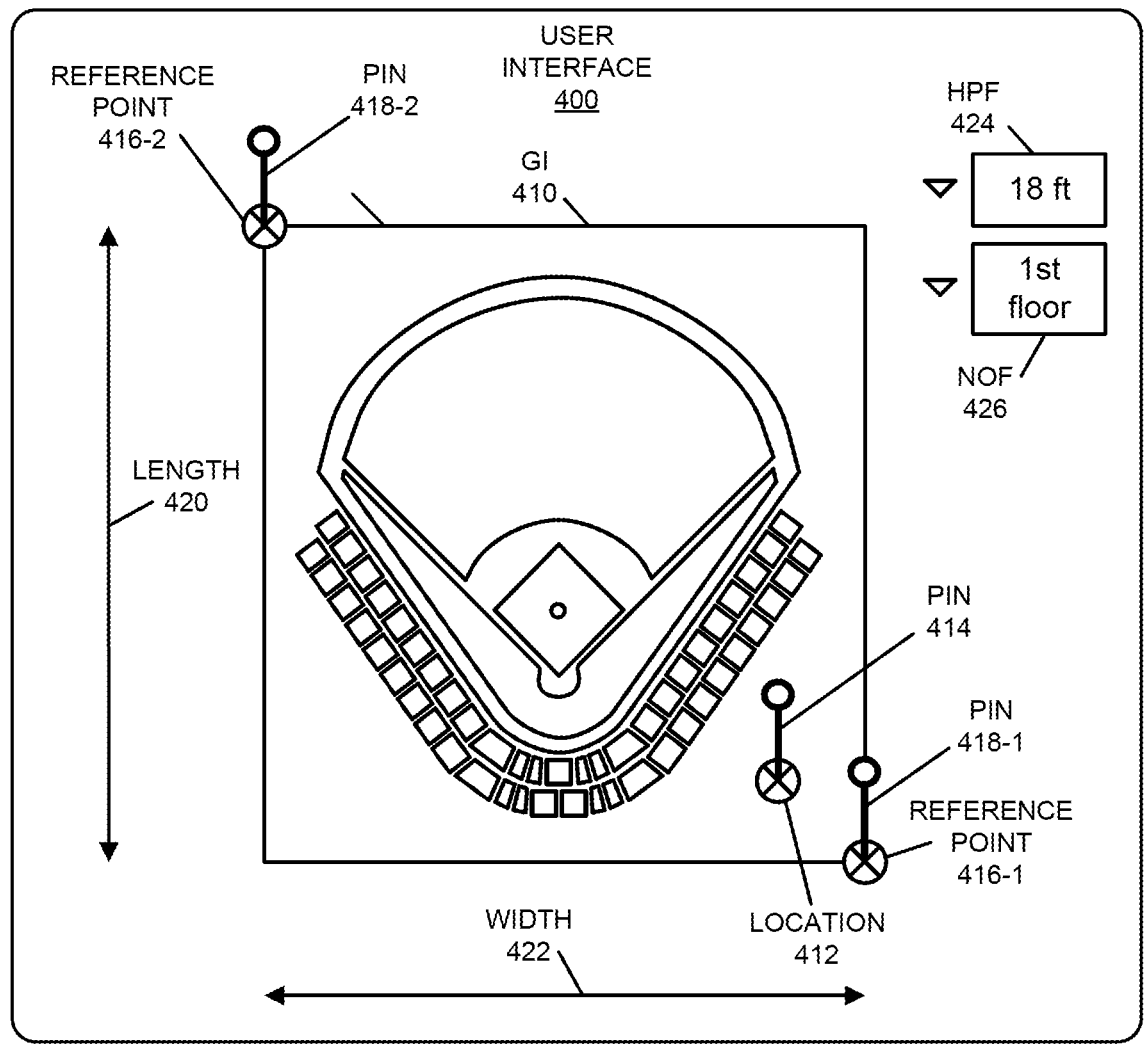
FIG. 4 is a drawing illustrating an example of a user interface in accordance with an embodiment of the present disclosure.

This is shown in FIG. 4, which presents a drawing illustrating an example of a user interface 400, which may be displayed on a display by an electronic device, such as electronic device 112-1 or computer 124 in FIG. 1. This user interface may include a graphical representation (GI) 410 of a region that includes a location 412 (such as a stadium map). A user may interact with user interface 400 to indicate radio node 110-1 (FIG. 1) is installed at location 412. For example, the user may place a virtual marker or pin 414 at location 412.

Moreover, the user may interact with user interface 400 to specify two reference points 416 (such as two corners) in the region or on a boundary of the region. For example, the user may place virtual markers or pins 418 at reference points 416. In response, the electronic device may access geographic coordinates of reference points 416 (such as GPS coordinates or from a mapping service, e.g., Google Maps from Google, Inc. of Mountain View, California). Then, the electronic device may calibrate the two geometric scales of the region (such as length 420 and width 422) based at least in part on the two reference points 416. Next, the electronic device may determine geometric coordinates of location 412 having a predefined accuracy in a horizontal plane. Notably, the electronic device may calculate the geometric coordinates based at least in part on the two geometric scales and geometric coordinates of at least one of the two reference points 416.

Furthermore, the user may interact with user interface 400 to provide or specify a predefined height per floor (HPF) 424 in a building and/or a number of floors (NOF) 426 corresponding to the region. For example, the user may select the predefined height per floor 424 and/or the number of floors 426 using a user-interface object (such as a pull-down menu, a radio button, etc.) in user interface 400. In some embodiments, the electronic device uses select the predefined height per floor 424 and the number of floors 426 to calculate a height of location 412, which has a predefined accuracy in a vertical direction. Consequently, in some embodiments, the height may be included in the geometric coordinates.

Additionally, the electronic device may provide the geometric coordinates of location 412 to another electronic device. This other electronic device may be used by a certified professional installer of radio node 110-1 (FIG. 1) or may be a SAS. In these ways, the management techniques may assist the user (who may be the certified professional installer) during the design of a small-scale network and/or during the installation of radio node 110-1 (FIG. 1).

Figure 5:
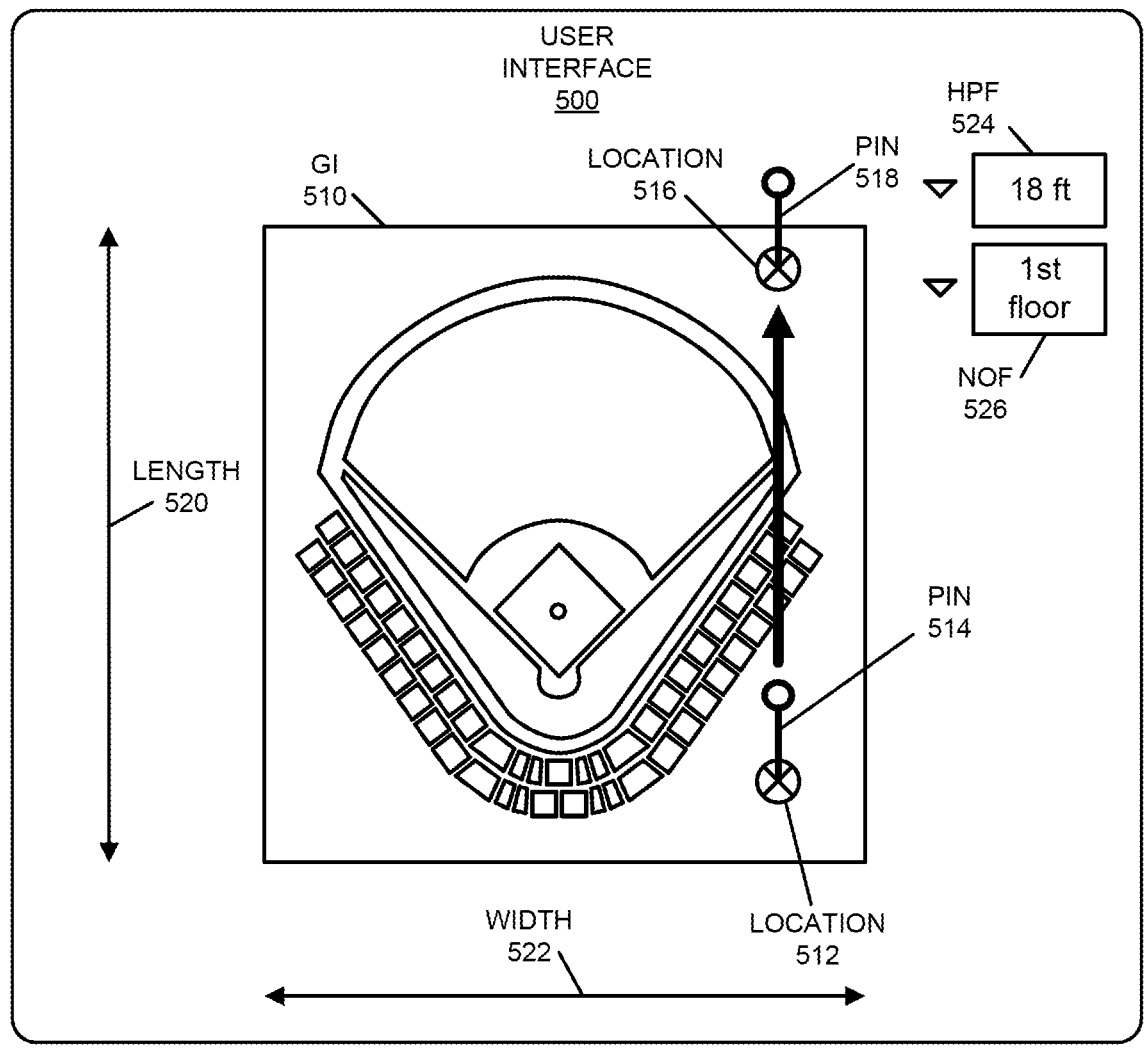
FIG. 5 is a drawing illustrating an example of a user interface in accordance with an embodiment of the present disclosure.

The one or more user interfaces may be used to plan a modification of the small-scale network. This is shown in FIG. 5, which presents a drawing illustrating an example of a user interface 500, which may be displayed on a display by an electronic device, such as electronic device 112-1 or computer 124 in FIG. 1. This user interface may include a graphical representation (GI) 510 of a region that includes location 512 where radio node 110-1 (FIG. 1) is currently installed. For example, user interface 500 may include a virtual marker or pin 514 at location 512.

Moreover, the user may interact with user interface 500 to indicate a prospective relocation of radio node 110-1 (FIG. 1) from location 512 to location 516 in the region. For example, the user may drag and drop pin 514 from location 512 to location 516. Alternatively, the user may place virtual marker or pin 518 at location 516.

In response, the electronic device may determine geometric coordinates of location 516 having a predefined accuracy in a horizontal plane. For example, the electronic device may calculate the geometric coordinates based at least in part on the two geometric scales of the region (such as length 520 and width 522) and geometric coordinates of at least a reference point, such as location 512.

Furthermore, in some embodiments, the electronic device uses a predefined height per floor 524 and a number of floors 526 corresponding to the region to calculate a height of location 516, which has a predefined accuracy in a vertical direction, and which may be included in the geometric coordinates of location 516. For example, the user may select the predefined height per floor 524 and/or the number of floors 526 using a user-interface object (such as a pull-down menu, a radio button, etc.) in user interface 500.

Additionally, when location 516 is more than an allowed distance from location 512, the electronic device may perform an action. Notably, the electronic device may: provide information about the prospective relocation to a computer or server (such as a SAS); provide an alert; request confirmation of the prospective relocation; and/or perform a remedial action (such as schedule a visit by an installer, e.g., a certified professional installer, to complete the prospective relocation). In these ways, the management techniques may assist the user (who may be a network operator) during planning of a modification to a small-scale network.

In some embodiments of the management techniques, a radio node may perform a CBSD registration with the SAS. Alternatively, a cloud-based controller may pre-register the radio node by exchanging the initial certification and then bring up the radio node. For example, the controller may provide the installation information (such as the location and/or antenna attributes, e.g., directional, beam width, etc.). In this case, the radio node may send software-specific information and an identifier (which may not be encoded). The controller may provide an instruction to the radio node on how to complete the registration with the SAS. Note that if there is a factory reset or if the radio node is moved by less than 50 m, the controller may push encoded data to the radio node.

In some embodiments, one or more operations in the management techniques are performed dynamically as a user iteratively considers different prospective locations or positions for a radio node in a region. This capability may allow the computer to provide real-time feedback to the user about a prospective relocation of the radio node. For example, the feedback may indicate whether the prospective relocation will require a re-installation by a professional installer because the location has been changed by more than an allowed distance (such as 50 m in a horizontal plane and/or 3 m in a vertical direction). This capability may provide an improvement in efficiency and/or an improvement in the functionality of the computer or the network. For example, the management techniques can reduce the number of iterations (and, thus, the amount of computations and communication) needed to find an acceptable placement of the radio node that may not require re-installation.

In some embodiments, the feedback may include an estimate of the communication performance of the radio node at a new location or position specified by the prospective relocation. Notably, based at least in part on measurements of communication-performance metrics (such as RSRP, RSSI, etc.) of or associated with one radio nodes (such as the RSRP of the radio node, which may be or may have been previously measured by one or more other radio nodes and/or electronic devices), the computer may computer an estimate of the communication performance of the radio node at the new location or position. This information and/or a change in the communication performance relative to that at a current location or position of the radio node may be included in the displayed user interface. Consequently, the feedback may assist the user in rapidly determining whether the new location in the prospective relocation is a suitable placement of the radio node.

Figure 6:
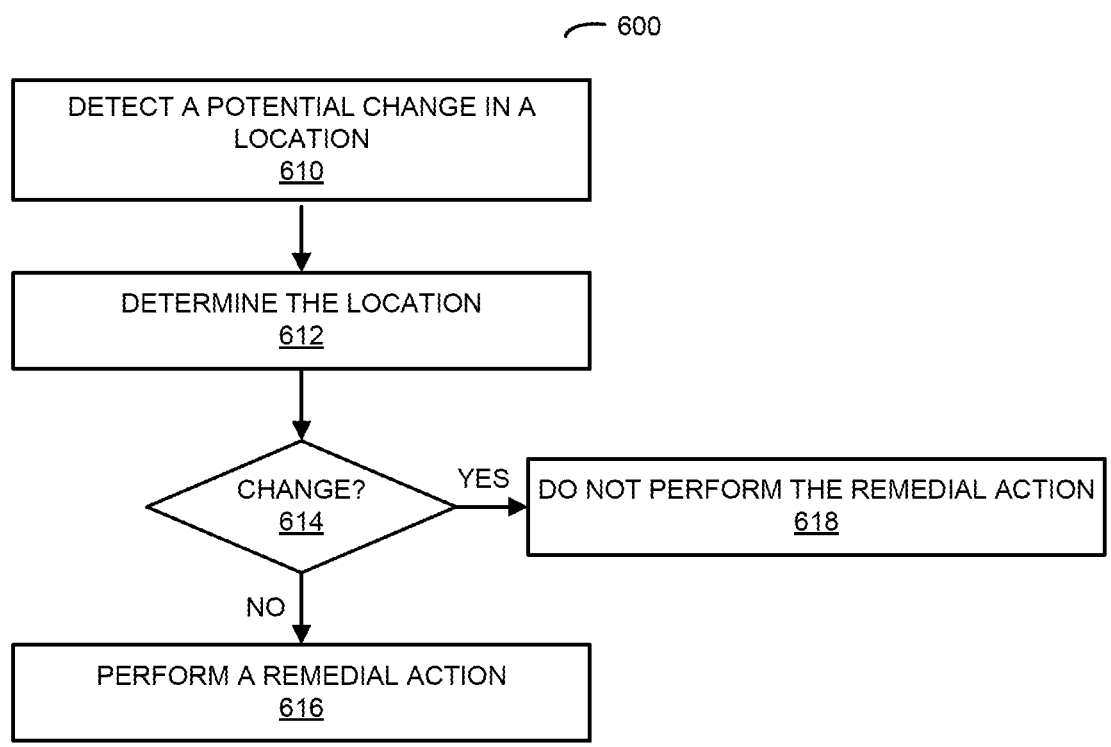
FIG. 6 is a flow diagram illustrating an example of a method for selectively performing a remedial action in FIG. 1 in accordance with an embodiment of the present disclosure.

FIG. 6 presents a flow diagram illustrating an example of a method 600 for selectively performing a remedial action in FIG. 1 in accordance with an embodiment of the present disclosure, which may be performed by a radio node (such as radio node 110-1 in FIG. 1). During operation, the radio node may detect a potential change in a location (operation 610) of the radio node relative to a predefined location. In some embodiments, the radio node may detect the potential change in the location based at least in part on a change in one or more network parameters of the radio node. For example, the change in the one or more network parameters may include one or more of: a change in a subnet that includes the radio node, a change in an IP address of the radio node, expiration of a DHCP IP address of the radio node, a change in a switch coupled to the radio node, or a change in a port in the switch coupled to the radio node. Moreover, the radio node may detect the potential change in the location based at least in part on a scan of wireless signals in an environment of the radio node.

Then, in response to detecting the potential change in the location (operation 610), the radio node may determine the location (operation 612) of the radio node. For example, the location may be determined using a positioning system, such as a Global Positioning System. Alternatively or additionally, the location may be determined based at least in part on a wireless neighborhood of the radio node.

When there is at least a predefined change in the location (operation 614) of the radio node relative to the predefined location, the radio node may selectively perform the remedial action (operation 616). Note that the predefined change in the location may be at least 3 m along a first direction or at least 50 m in a plane defined by a second direction and a third direction that are perpendicular to the first direction. In some embodiments, the radio node calculates that there is at least the predefined change in the location of the radio node using two or more of: the change in the one or more network parameters, the scan, and the determined location.

Moreover, the remedial action may include: providing an alert or a notification; discontinuing transmissions from the radio node; re-register the radio node (such as scheduling a certified professional installer to re-register the radio node at the determined location); or provide information about the determined location to a computer or server (such as a SAS) associated with the network that includes the radio node.

Note that the network may include a small cell. Moreover, the radio node may include: an eNodeB, a UMTS NodeB and RNC, a NR gNB or gNodeB, etc.

Furthermore, the radio node may communicate with the one or more electronic devices using a cellular-telephone communication protocol (such as LTE), and the radio node may communicate with the one or more other radio nodes using a wired communication protocol.

In some embodiments of method 600, there may be additional or fewer operations. For example, when the predefined change in the location of the radio node does not occur (operation 614), the radio node may not perform the remedial action (operation 618). Furthermore, the order of the operations may be changed, and/or two or more operations may be combined into a single operation.

Figure 7:
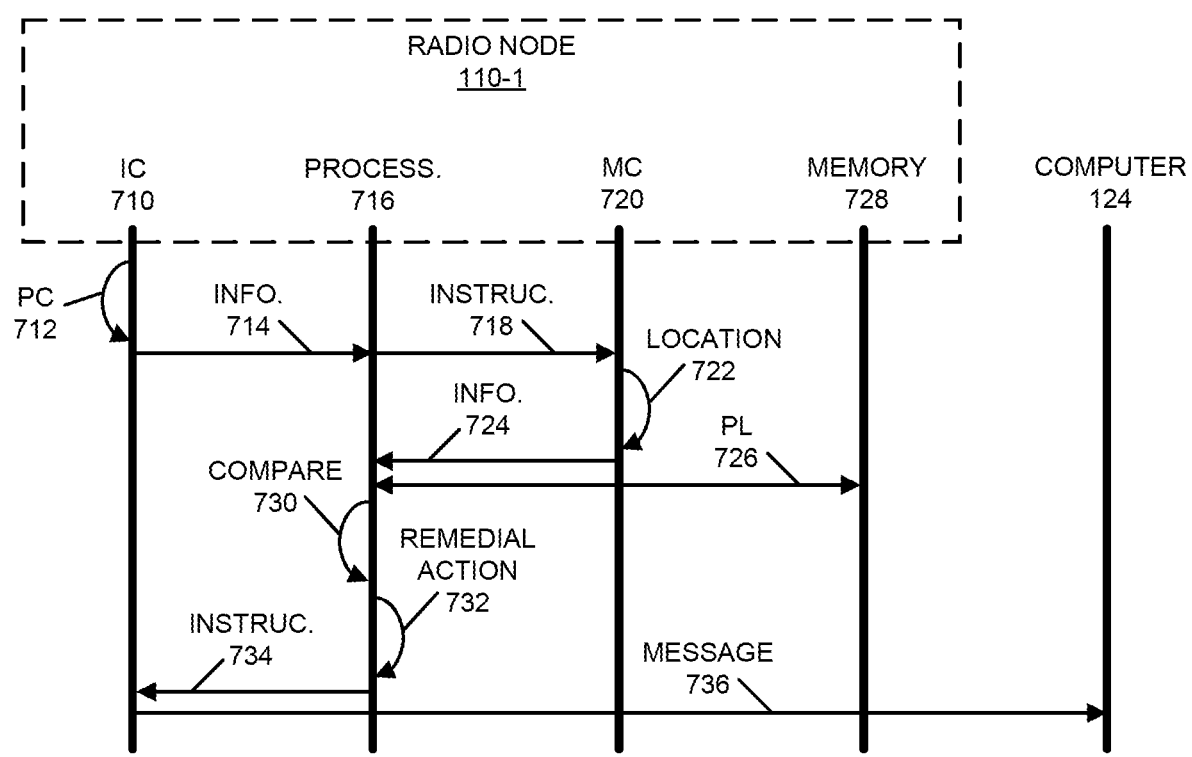
FIG. 7 is a drawing illustrating an example of communication among the electronic devices in FIG. 1 in accordance with an embodiment of the present disclosure.

Embodiments of the management techniques are further illustrated in FIG. 7, which presents a drawing illustrating an example of communication between radio node 110-1 and computer 124. In FIG. 7, interface circuit 710 in radio node 110-1 may detect a potential change (PC) 712 in a location of radio node 110-1 relative to a predefined location 726. For example, interface circuit 710 may detect the potential change 712 in the location based at least in part on a change in one or more network parameters of radio node 110-1 and/or by performing a scan of wireless signals in an environment of radio node 110-1.

Interface circuit 710 may provide information 714 about the potential change 712 to processor 716 in radio node 110-1. In response, processor 716 may provide an instruction 718 to measurement circuit (MC) 720 in radio node 110-1 to determine a location 722 of radio node 110-1. For example, location 722 may be determined using a positioning system, such as a Global Positioning System. (Alternatively or additionally, location 722 may be determined, e.g., by processor 716, based at least in part on a wireless neighborhood of radio node 110-1.)

Then, measurement circuit 720 may provide information 724 about location 722 to processor 716.

Next, processor 716 may access information specifying the predefined location (PL) 726 in memory 728 in radio node 110-1, and processor 716 may compare 730 the location 722 and the predefined location 726. When there is at least a predefined change in the location 722 of radio node 110-1 relative to the predefined location 726, processor 716 may selectively perform remedial action 732. For example, processor 716 may provide an instruction 734 to interface circuit 710 to provide a message 736 to computer 124 (or computer 126), such as: an alert or a notification; scheduling a certified professional installer to re-register radio node 110-1 at location 722; and/or provide information about location 722. Alternatively or additionally, instruction 734 may indicate that interface circuit 710 should discontinue transmissions from radio node 110-1 (e.g., until radio node 110-1 is re-registered).

While FIG. 7 illustrates communication between components using unidirectional or bidirectional communication with lines having single arrows or double arrows, in general the communication in a given operation in this figure may involve unidirectional or bidirectional communication.

Figure 8:
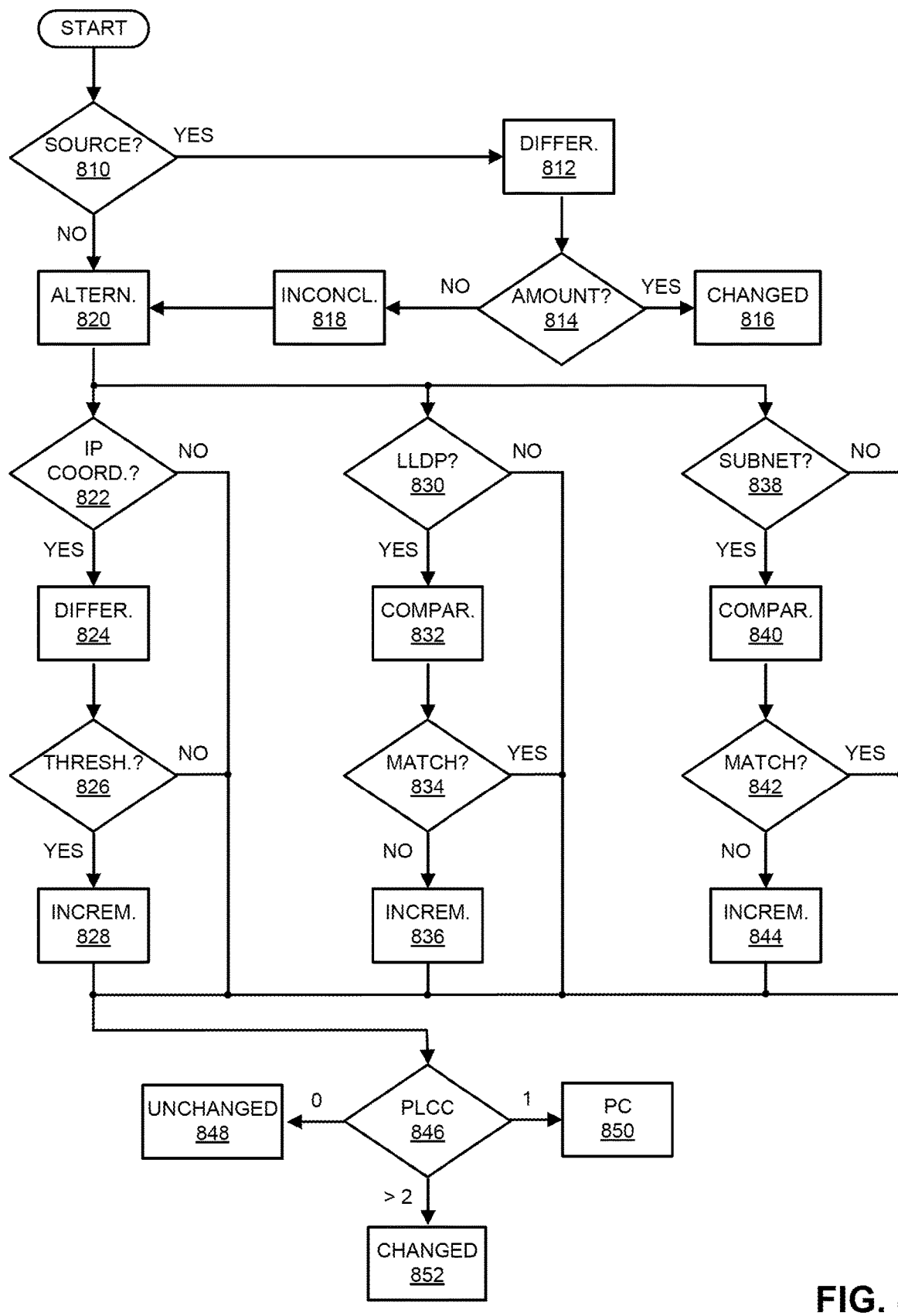
FIG. 8 is a drawing illustrating an example of a method for detecting a location change in accordance with an embodiment of the present disclosure.

FIG. 8 presents a drawing illustrating an example of a method 800 for detecting a location change in accordance with an embodiment of the present disclosure. This method may be used in embodiments of the management techniques, such as in method 600 (FIG. 6). While method 800 is illustrated as being performed by a radio node, in other embodiments method 800 may, at least in part, be performed by a group of radio nodes and/or a computer (such as a controller for at least the radio node).

In FIG. 8, the radio node may determine whether a Global Positioning System (GPS) is a synchronization source for the radio node (operation 810). If yes, the radio node may calculate a difference (operation 812) between an installer authorized (or predefined) location and the location determined using the Global Positioning System. If the difference is greater than a predefined amount (operation 814), such as a threshold corresponding to the change in location based at least in part on the Global Positioning System and an error margin, the radio node may determine that the location of the radio node has changed (operation 816). Otherwise, if the Global Positioning System is inconclusive for the location change (operation 818) or if the Global Positioning System is not the synchronization source (operation 810), an alternative technique may used to detect the location change (operation 820).

Notably, when the geographic-IP coordinates are derived (operation 822), the radio node may calculate a different between the installer authorized location and the geographic-IP-derived coordinates (operation 824). If the difference is less than that a location-change threshold (operation 826), the radio node may increment a probable location-change count (operation 828).

Moreover, when data associated with a link-layer discovery protocol (LLDP) is available (operation 830), the radio node may compare a current chassis identifier and/or port identifier with values stored when the radio node was registered (operation 832). If the current chassis identifier and port identifier do not match the values stored at registration (operation 834), the radio node may increment the probable location-change count (operation 836).

Furthermore, when the current IP-subnet information is derived (operation 838), the radio node may compare the current IP-subset information with stored information from when the radio node was registered (operation 840). If the current IP-subnet information does not match the stored information (operation 842), the radio node may increment the probable location-change count (operation 844).

Next, the radio node may evaluate the probable location-change count or PLLC (operation 846). When the probable location-change count has a value of zero, the radio node may determine that the location of the radio node is unchanged (operation 848). Alternatively, when the probable location-change count has a value of one, the radio node may determine that the location of the radio node has probably changed or PC (operation 850). Additionally, when the probable location-change count has a value greater than or equal to two, the radio node may determine that the location of the radio node has changed (operation 852).

In some embodiments of method 800, there may be additional or fewer operations. Furthermore, the order of the operations may be changed, and/or two or more operations may be combined into a single operation.

We now describe embodiments of an electronic device, which may perform at least some of the operations in the management techniques. FIG. 9 presents a block diagram illustrating an example of an electronic device 900 in accordance with some embodiments, such as one of radio nodes 110, electronic devices 112, computer 124 and/or computer 126. This electronic device includes processing subsystem 910, memory subsystem 912, and networking subsystem 914. Processing subsystem 910 includes one or more devices configured to perform computational operations. For example, processing subsystem 910 can include one or more microprocessors, graphics processing units (GPUs), ASICs, microcontrollers, programmable-logic devices, and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions (such as program instructions 922 or operating system 924), which may be executed by processing subsystem 910. Note that the one or more computer programs or program modules may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910.

In addition, memory subsystem 912 can include mechanisms for controlling access to the memory. In some embodiments, memory subsystem 912 includes a memory hierarchy that includes one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including: control logic 916, an interface circuit 918 and one or more antennas 920 (or antenna elements). (While FIG. 9 includes one or more antennas 920, in some embodiments electronic device 900 includes one or more nodes, such as antenna nodes 908, e.g., a pad, which can be coupled to the one or more antennas 920, or nodes 906, which can be coupled to a wired or optical connection or link. Thus, electronic device 900 may or may not include the one or more antennas 920. Note that the one or more nodes 906 and/or antenna nodes 908 may constitute input(s) to and/or output(s) from electronic device 900.) For example, networking subsystem 914 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 900 may be adapted or changed using pattern shapers (such as reflectors) in one or more antennas 920 (or antenna elements), which can be independently and selectively electrically coupled to ground to steer the transmit antenna pattern in different directions. Thus, if one or more antennas 920 include N antenna pattern shapers, the one or more antennas may have 2 N different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 900 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices as described previously.

Within electronic device 900, processing subsystem 910, memory subsystem 912, and networking subsystem 914 are coupled together using bus 928. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc.

Electronic device 900 can be (or can be included in) any electronic device with at least one network interface. For example, electronic device 900 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an eNodeB, a controller, test equipment, and/or another electronic device.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program instructions 922 are included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914. The integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein includes receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and an LTE communication protocol as an illustrative example, in other embodiments a wide variety of communication protocols and, more generally, wired or wireless communication techniques may be used. For example, instead of Ethernet, a communication protocol that is compatible with the Internet Protocol is used. Thus, the management techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the management techniques may be implemented using program instructions 922, operating system 924 (such as a driver for interface circuit 918) or in firmware in interface circuit 918. Thus, the management techniques may be implemented at runtime of program instructions 922. Alternatively or additionally, at least some of the operations in the management techniques may be implemented in a physical layer, such as hardware in interface circuit 918.

While examples of numerical values are provided in the preceding discussion, in other embodiments different numerical values are used. Consequently, the numerical values provided are not intended to be limiting.

Moreover, while the preceding embodiments illustrated the use of the management techniques with the CBRS (e.g., a frequency band near 3.5 GHz), in other embodiments of the management techniques different wireless signals and/or different frequency band(s) may be used. For example, the wireless signals may be communicated in one or more bands of frequencies, including: 900 MHz, 2.4 GHz, 5 GHz, 6 GHz, 60 GHz, and/or a band of frequencies used by LTE or another cellular-telephone communication protocol or data communication protocol. Note that the communication between electronic devices may use multi-user transmission (such as orthogonal frequency division multiple access or OFDMA).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A radio node, comprising:
   a first interface circuit configured to communicate with one or more electronic devices in a network;
   a second interface circuit configured to communicate with one or more other radio nodes in the network;
   a processor;
   memory, coupled to the processor, configured to store program instructions, wherein, when executed by the processor the program instructions cause the radio node to perform operations comprising:
   detecting a potential change in a location of the radio node relative to a predefined location;
   in response to detecting the potential change in the location, determining the location of the radio node; and
   when there is at least a predefined change in the location of the radio node relative to the predefined location, selectively performing a remedial action, wherein the predefined change corresponds to requirements associated with a Citizens Broadband Radio Service (CBRS), and
   wherein the predefined change in the location is at least 3 m along a first direction or at least 50 m in a plane defined by a second direction and a third direction that are perpendicular to the first direction.

2. The radio node of claim 1, wherein the potential change in the location is detected based at least in part on a change in one or more network parameters of the radio node.

3. The radio node of claim 2, wherein the change in the one or more network parameters comprises one or more of: a change in a subnet that includes the radio node, a change in an Internet Protocol (IP) address of the radio node, expiration of a dynamic host control protocol (DHCP) IP address of the radio node, a change in a switch coupled to the radio node, or a change in a port in the switch coupled to the radio node.

4. The radio node of claim 1, wherein the potential change in the location is detected based at least in part on a scan of wireless signals in an environment of the radio node.

5. The radio node of claim 1, wherein the location is determined using a positioning system, based at least in part on a wireless neighborhood of the radio node, or both.

6. The radio node of claim 5, wherein the positioning system comprises a Global Positioning System.

7. The radio node of claim 1, wherein the radio node is configured to calculate that there is at least the predefined change in the location of the radio node using two or more of: a change in a network parameter of the radio node, a scan of wireless signals in an environment of the radio node, and the determined location.

8. The radio node of claim 1, wherein the network comprises a small cell.

9. The radio node of claim 1, wherein the radio node comprises: an Evolved Node B (eNodeB), a Universal Mobile Telecommunications System (UMTS) NodeB and radio network controller (RNC), or a New Radio (NR) gNB or gNodeB.

10. The radio node of claim 1, wherein the radio node is configured to communicate with the one or more electronic devices using a cellular-telephone communication protocol, and the radio node is configured to communicate with the one or more other radio nodes using a wired communication protocol.

11. The radio node of claim 1, wherein the remedial action comprises: providing an alert or a notification; discontinuing transmissions from the radio node; re-register the radio node; or provide information about the determined location to a server associated with the network that includes the radio node.

12. A non-transitory computer-readable storage medium for use in conjunction with a radio node, the computer-readable storage medium storing program instructions that, when executed by the radio node, cause the radio node to perform operations comprising:
  detecting a potential change in a location of the radio node relative to a predefined location;
  in response to detecting the potential change in the location, determining the location of the radio node; and
  when there is at least a predefined change in the location of the radio node relative to the predefined location, selectively performing a remedial action, wherein the predefined change corresponds to requirements associated with a Citizens Broadband Radio Service (CBRS), and
  wherein the predefined change in the location is at least 3 m along a first direction or at least 50 m in a plane defined by a second direction and a third direction that are perpendicular to the first direction.

13. The non-transitory computer-readable storage medium of claim 12, wherein the potential change in the location is detected based at least in part on a change in one or more network parameters of the radio node.

14. The non-transitory computer-readable storage medium of claim 13, wherein the change in the one or more network parameters comprises one or more of: a change in a subnet that includes the radio node, a change in an Internet Protocol (IP) address of the radio node, expiration of a dynamic host control protocol (DHCP) IP address of the radio node, a change in a switch coupled to the radio node, or a change in a port in the switch coupled to the radio node.

15. The non-transitory computer-readable storage medium of claim 12, wherein the potential change in the location is detected based at least in part on a scan of wireless signals in an environment of the radio node.

16. The non-transitory computer-readable storage medium of claim 12, wherein the location is determined using a positioning system, based at least in part on a wireless neighborhood of the radio node, or both.

17. The non-transitory computer-readable storage medium of claim 12, wherein the radio node is configured to calculate that there is at least the predefined change in the location of the radio node using two or more of: a change in a network parameter of the radio node, a scan of wireless signals in an environment of the radio node, and the determined location.

18. The non-transitory computer-readable storage medium of claim 12, wherein the remedial action comprises: providing an alert or a notification; discontinuing transmissions from the radio node; re-register the radio node; or provide information about the determined location to a server associated with the network that includes the radio node.

19. A method for selectively performing a remedial action, comprising:
  by a radio node:
  detecting a potential change in a location of the radio node relative to a predefined location;
  in response to detecting the potential change in the location, determining the location of the radio node; and
  when there is at least a predefined change in the location of the radio node relative to the predefined location, selectively performing the remedial action, wherein the predefined change corresponds to requirements associated with a Citizens Broadband Radio Service (CBRS), and
  wherein the predefined change in the location is at least 3 m along a first direction or at least 50 m in a plane defined by a second direction and a third direction that are perpendicular to the first direction.

20. The method of claim 19, wherein the potential change in the location is detected based at least in part on: a change in one or more network parameters of the radio node; or a scan of wireless signals in an environment of the radio node.

* * * * *